(12) United States Patent
Nagasawa

(10) Patent No.: US 12,054,049 B2
(45) Date of Patent: Aug. 6, 2024

(54) AGENT APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 93 days.

(21) Appl. No.: 17/858,535

(22) Filed: Jul. 6, 2022

(65) Prior Publication Data

US 2023/0034454 A1 Feb. 2, 2023

(30) Foreign Application Priority Data

Jul. 29, 2021 (JP) .................................. 2021-123829

(51) Int. Cl.
| | |
|---|---|
| *B60K 37/02* | (2006.01) |
| *B60K 35/60* | (2024.01) |
| *G06T 13/40* | (2011.01) |
| *B60K 35/21* | (2024.01) |
| *B60K 35/26* | (2024.01) |
| *B60K 35/28* | (2024.01) |

(52) U.S. Cl.
CPC .............. *B60K 35/60* (2024.01); *G06T 13/40* (2013.01); *B60K 35/211* (2024.01); *B60K 35/265* (2024.01); *B60K 35/28* (2024.01); *B60K 2360/162* (2024.01)

(58) Field of Classification Search
CPC ............ B60K 37/02; B60K 2370/1531; B60K 2370/1575; B60K 2370/162
See application file for complete search history.

(56) References Cited

U.S. PATENT DOCUMENTS

| | | | | |
|---|---|---|---|---|
| 6,429,720 | B1 * | 8/2002 | Gilbert | ................... G01R 19/02 327/348 |
| 7,079,925 | B2 * | 7/2006 | Kubota | .................... G08G 1/20 701/1 |
| 8,461,971 | B2 * | 6/2013 | Ohta | ................... G01C 21/3697 345/157 |
| 11,159,666 | B1 * | 10/2021 | Beecham | ........... G06Q 30/0267 |
| 2019/0375295 | A1 * | 12/2019 | Nakamura | ............. B60K 37/02 |
| 2022/0219655 | A1 * | 7/2022 | Sakuragi | ............... B60T 7/085 |
| 2023/0234564 | A1 * | 7/2023 | Nagasawa | ............. B60W 40/09 |

FOREIGN PATENT DOCUMENTS

JP 2018-032204 A 3/2018

* cited by examiner

*Primary Examiner* — John A Tweel, Jr.
(74) *Attorney, Agent, or Firm* — MCGINN I.P. LAW GROUP, PLLC

(57) ABSTRACT

An agent apparatus includes a shift position detector and an agent controller. The shift position detector is configured to detect a shift position of a vehicle. The agent controller is configured to control a personified agent. The agent controller is configured to cause the agent to face a driver of the vehicle in a case where the shift position is in a parking range. Upon communicating information, the agent controller is configured to cause the agent to output the information using voice and a movement of arms of the agent.

13 Claims, 11 Drawing Sheets

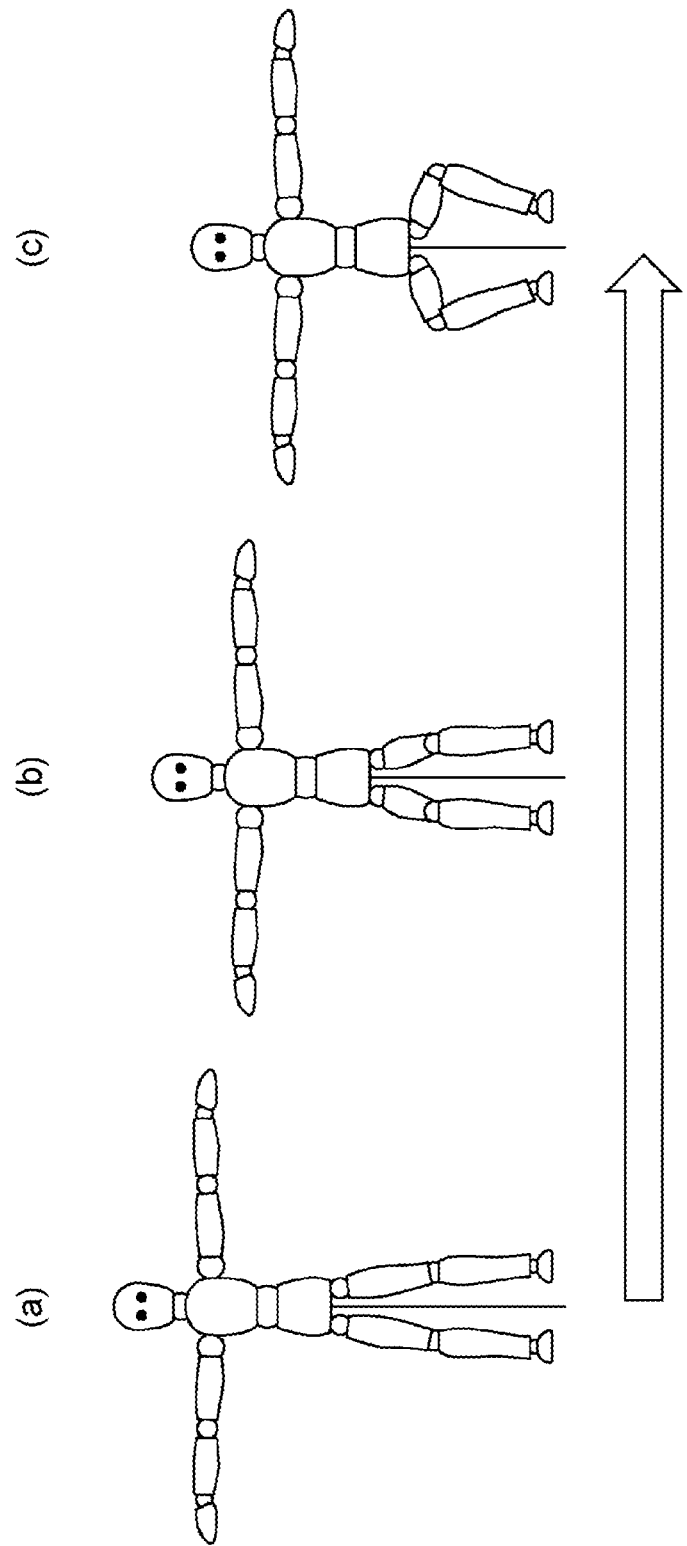

AGENT APPARATUS

CROSS-REFERENCE TO RELATED APPLICATIONS

The present application claims priority from Japanese Patent Application No. 2021-123829 filed on Jul. 29, 2021, the entire contents of which are hereby incorporated by reference.

BACKGROUND

The disclosure relates to an agent apparatus capable of reporting using a personified character.

Hitherto, various methods have been proposed as methods for warning the occupant(s) (especially the driver) of a vehicle such as an automobile in the vehicle's driving environment.

As one of these methods, there have been proposed an agent apparatus and a driving assistance apparatus which provide information regarding driving assistance in response to a request from the occupant while the occupant and a personified character (so-called agent) interact with each other.

For example, there has been proposed a driving assistance apparatus of the related art (Japanese Unexamined Patent Application Publication (JP-A) No. 2018-032204). Because it has been considered that danger avoidance notification by voice or the like has difficulty in intuitively notifying the driver to take an action to avoid danger, a small robot is placed in a dashboard to appear as a personified agent, and the agent is caused to simulate an action for the driver to take in order to avoid danger.

SUMMARY

An aspect of the disclosure provides an agent apparatus including a shift position detector configured to detect a shift position of a vehicle, and an agent controller configured to control a personified agent. In a case where the shift position is in a parking range, the agent controller is configured to cause the agent to face a driver of the vehicle, and, upon communicating information, the agent controller is configured to cause the agent to output the information using voice and a movement of arms of the agent.

An aspect of the disclosure provides an agent apparatus including a shift position detector configured to detect a shift position of a vehicle, and an agent controller configured to control a personified agent. The agent controller is configured to cause the agent to take a predetermined pose in a case where the shift position is in a non-parking range, and, in a case where the shift position returns to a parking range, cause the agent to face a driver of the vehicle and to perform voice output and a movement to express gratitude.

An aspect of the disclosure provides an agent apparatus including a shift position sensor configured to detect a shift position of a vehicle, and circuitry configured to control a personified agent. The circuitry is configured to cause the agent to face a driver of the vehicle in a case where the shift position is in a parking range, and, upon communicating information, cause the agent to output the information using voice and a movement of arms of the agent.

An aspect of the disclosure provides an agent apparatus including a shift position sensor configured to detect a shift position of a vehicle, and circuitry configured to control a personified agent. The circuitry is configured to cause the agent to take a predetermined pose in a case where the shift position is in a non-parking range, and, in a case where the shift position returns to a parking range, cause the agent to face a driver of the vehicle and to perform voice output and a movement to express gratitude.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 11 is a movement diagram illustrating an exemplary movement of the agent.

DETAILED DESCRIPTION

An agent of the related art is one that is inorganic or appears suddenly to warn the driver, and it has been difficult to establish a trust relationship between the agent and the driver.

In addition, even when the agent suddenly takes an action that is the same action as an action for avoiding danger, if the driver is unaware of the cause of taking the action, it is difficult for the driver to promptly take the action, and, particularly without a trust relationship, the driver does not take the action to avoid danger.

In order to solve such a problem of the related art, it is desirable to provide an agent apparatus capable of establishing a trust relationship between the agent and the driver on a regular basis and to enable the driver to instantly and smoothly take an action to avoid danger.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Configuration Inside Vehicle

Figure 1:
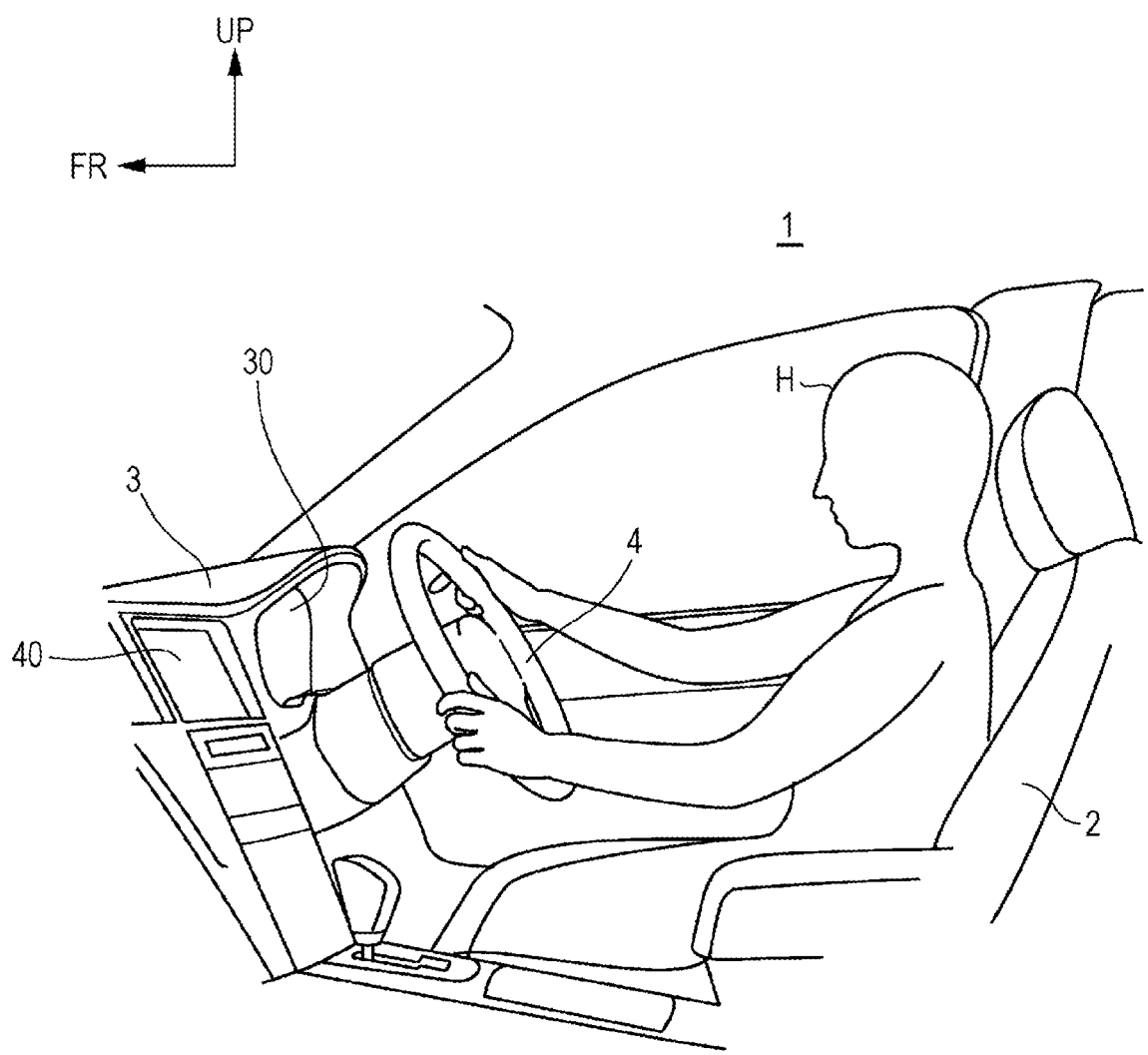
FIG. 1 is a perspective view illustrating the interior of a vehicle according to an embodiment of the disclosure.
Figure 2:
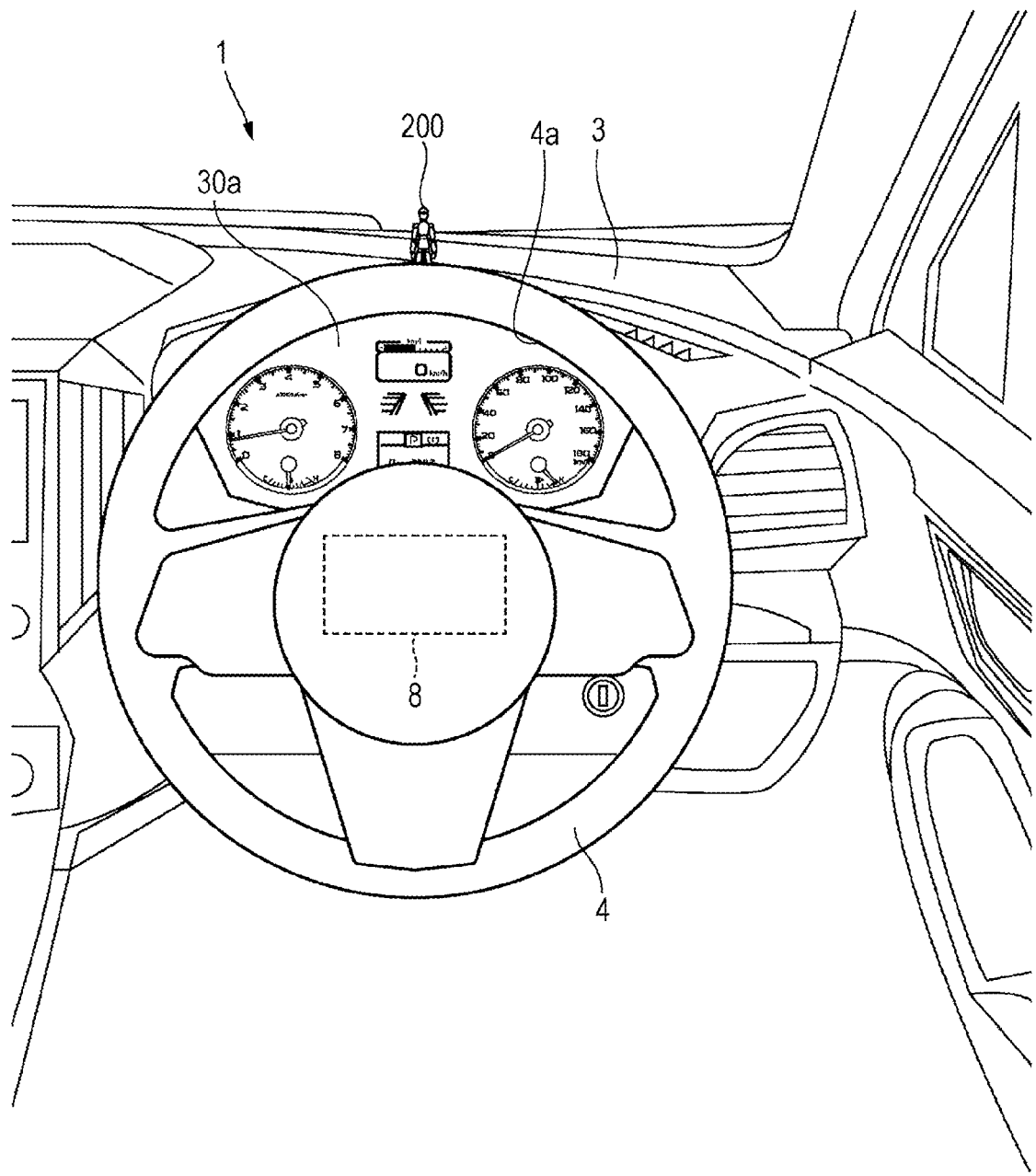
FIG. 2 is a front view illustrating the interior of the vehicle in front of a driver's seat.

As illustrated in FIGS. 1 and 2, a vehicle 1 includes an instrument panel 3, which is provided on the vehicle front side of a driver's seat 2, and a steering wheel 4, which is disposed between the driver's seat 2 and the instrument panel 3. The steering wheel 4 is rotatably attached to a steering column (not illustrated) with a steering shaft (not illustrated) interposed therebetween. An airbag 8, which inflates toward a driver H in the event of a collision of the vehicle 1 or the like, is stored inside the steering wheel 4.

Although an agent apparatus 100 (described later) of the present embodiment and an agent 200 (described later) will be described based on dialogues with the driver H and gestures (movements), the same may also be performed with other occupants.

As illustrated in FIG. 1, two display panels, a first display panel 30 and a second display panel 40, are provided inside the vehicle 1. The first display panel 30 is disposed in the instrument panel 3 on the front side of the driver's seat 2, and the second display panel 40 is disposed in the instrument panel 3 on the left front side of the driver's seat 2.

First Display Panel 30

As illustrated in FIGS. 1 and 2, the first display panel 30 includes pointer meters configured like analog timepieces, and a so-called liquid crystal display device including a liquid crystal panel and a backlight that are permanently affixed. The driver H is capable of viewing various types of information displayed in a first display area 30a of the first display panel 30 through an upper space 4a in the steering wheel 4.

As illustrated in FIG. 2, the first display panel 30 is provided with the first display area 30a. Two pointer meters that display information, such as the driving speed of the vehicle 1 (speed meter) and the number of rotations per unit time of the engine (tachometer), are provided in the left and right portions of the first display area 30a. A small liquid crystal display device that displays an image representing general vehicle information is disposed in the center of the first display panel 30, which is between the two pointer meters. Note that the first display panel 30 may be entirely configured of one liquid crystal display device without having pointer meters.

Second Display Panel 40

As illustrated in FIG. 1, the second display panel 40 is configured as, for example, a so-called liquid crystal display device including a liquid crystal panel and a backlight that are permanently affixed. Note that map information or the like is displayed on the second display panel 40, which serves as a so-called automotive navigation system.

Note that the liquid crystal display devices formed in the first display panel 30 and the second display panel 40 may be replaced with self-illuminated display devices, such as plasma displays or organic electroluminescent (EL) displays, or with display devices such as projection-type projectors.

Agent 200

Figure 3:
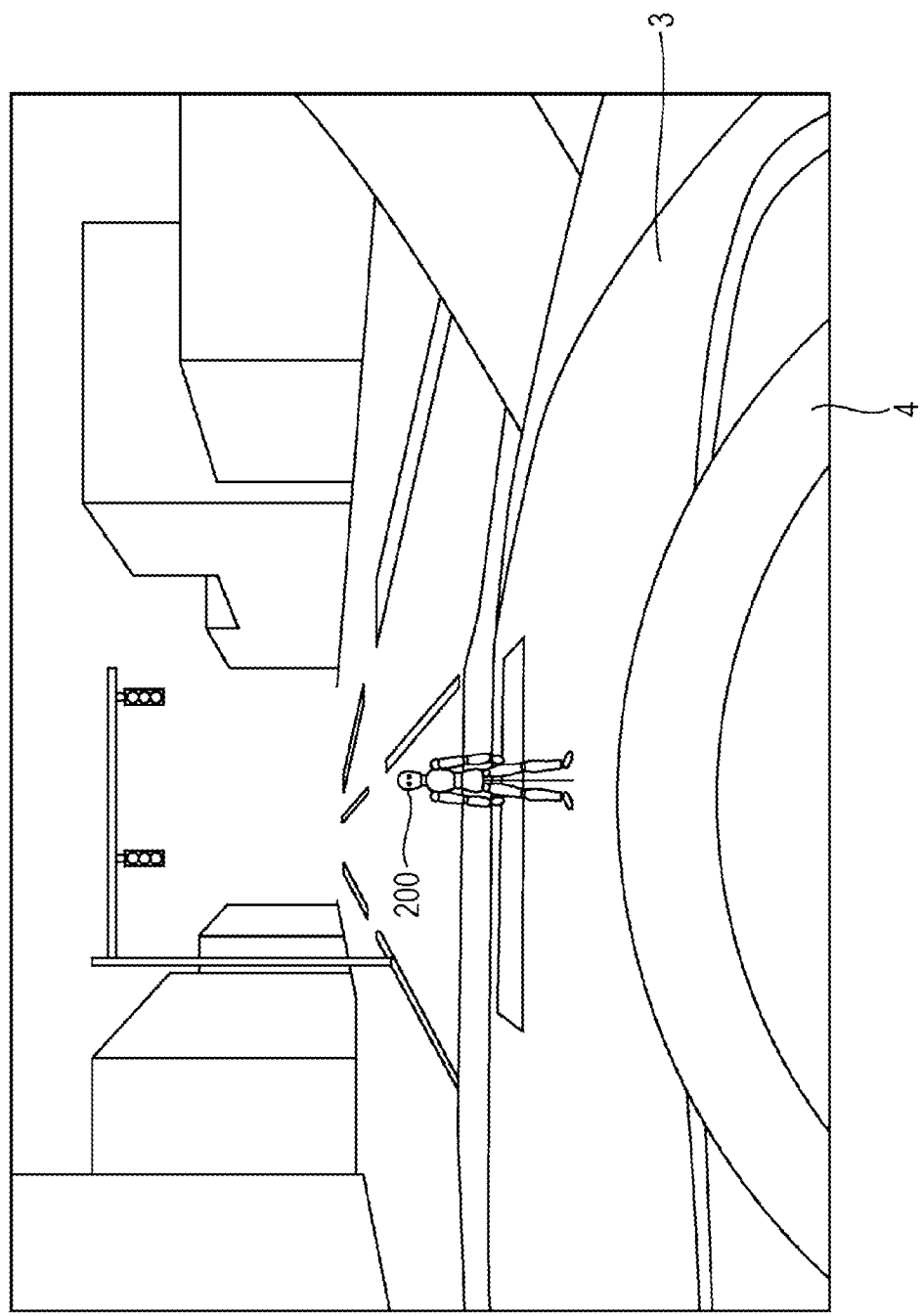
FIG. 3 is a front view illustrating the placement of an agent.

In addition, as illustrated in FIG. 3, the agent 200 is disposed in an upper portion of the instrument panel 3, which is on the front side of the driver's seat 2.

Note that the agent 200 may be disposed at any position as long as the agent 200 is within the driver H's peripheral visual field, and need not be disposed directly in front of the driver's seat 2. Note that it is desirable that the agent 200 be disposed at a position that is within the driver H's peripheral visual field and that does not block the driver H's visual field outside the vehicle 1. In addition, the position at which the agent 200 is disposed may be changeable by a certain operation device or in response to voice instructions or the like.

The agent 200 is a personified character, and is a three-dimensional informative and interactive object with a humanoid outline. Although the agent 200 is assumed to be a humanoid real-image three-dimensional object in the present embodiment, the agent 200 is not limited to this type, and the agent 200 may be a character displayed on a display device such as a display, a three-dimensional display object represented by holography, a virtual three-dimensional object, or the like.

Figure 4A:
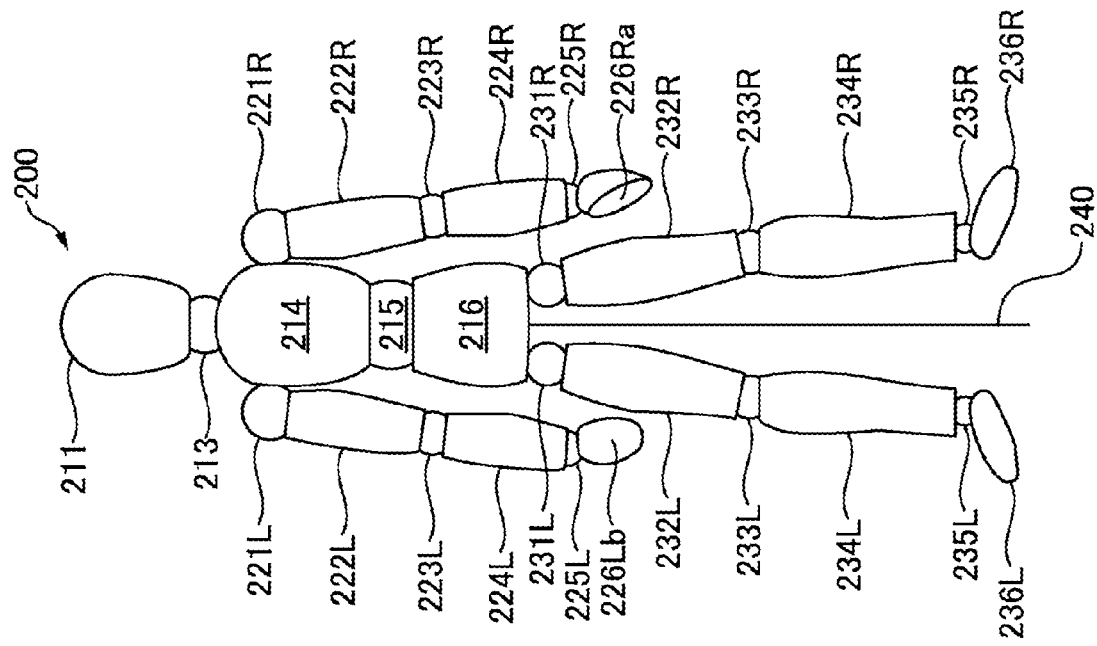
FIGS. 4A and 4B are schematic diagrams illustrating the configuration of the agent according to the embodiment of the disclosure.
Figure 4B:
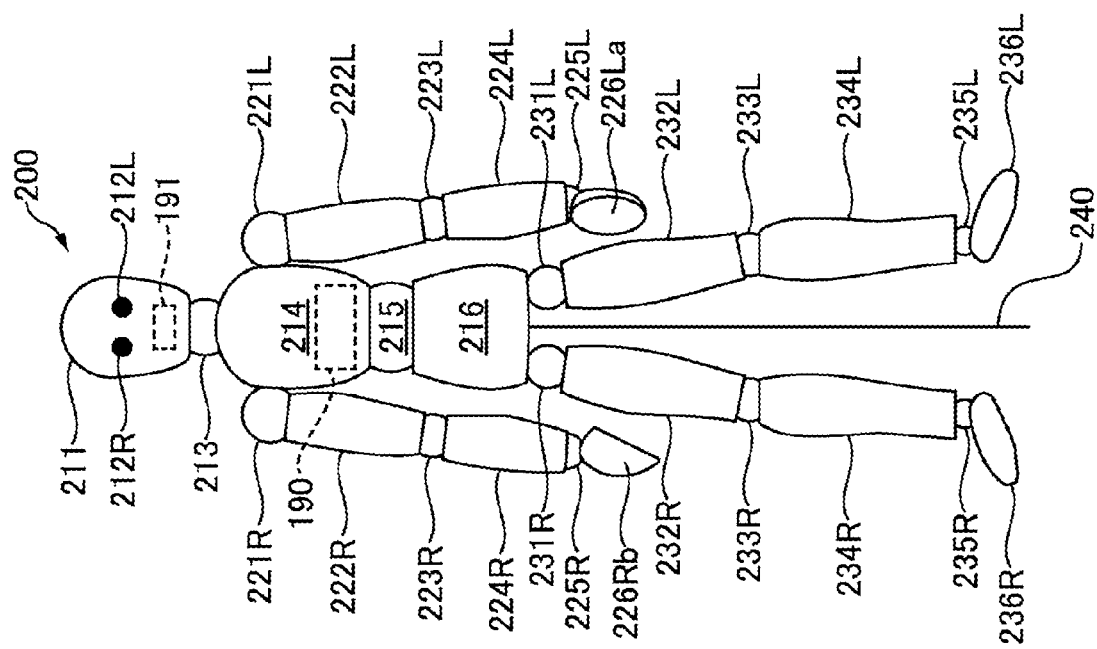

As illustrated in FIGS. 4A and 4B, the agent 200 includes a head 211, a right eye 212R, a left eye 212L, a neck 213, a chest 214, a waist 215, a buttock 216, a right shoulder 221R, a left shoulder 221L, a right upper arm 222R, a left upper arm 222L, a right elbow 223R, a left elbow 223L, a right forearm 224R, a left forearm 224L, a right wrist 225R, a left wrist 225L, a right hand 226R, a left hand 226L, a right hip joint 231R, a left hip joint 231L, a right thigh 232R, a left thigh 232L, a right knee 233R, a left knee 233L, a right lower leg 234R, a left lower leg 234L, a right ankle 235R, a left ankle 235L, a right foot 236R, and a left foot 236L.

The agent 200 is also provided with a support connector 240, and the agent 200 is supported to be able to stand on the instrument panel 3.

Note that ears are provided on both sides of the head 211 of the agent 200. This may convince the driver H that the agent 200 is listening closely to what the driver H says. In addition, even if the ears are not actually provided, the agent 200 may place the right hand 226R or the left hand 226L on the side of the head 211 of the agent 200 when listening to what the driver H says, as will be described later, which makes it look like the agent 200 is listening with its hand over its ear, thereby strengthening the trust relationship with the driver H.

Note that FIG. 4A is a diagram illustrating a basic pose when the agent 200 faces the driver H (the rear side of the vehicle 1), and FIG. 4B is a diagram illustrating a basic pose when the agent 200 turns its back on the driver H (faces the front side of the vehicle 1).

In addition, the agent 200 with a basic pose stands with a right palm 226Ra of the right hand 226R and a left palm 226La of the left hand 226L facing inward of the agent 200, and a back 226Rb of the right hand 226R and a back 226Lb of the left hand 226L facing outward of the agent 200.

As described above, the agent 200 is capable of freely rotating with a front pose facing the driver H and with a back pose turning its back on the driver H. That is, the agent 200 may be configured to rotate by itself around the support connector 240, or the agent 200 may be placed on a rotating body, and, by rotating this rotating body, the agent 200 may rotate from a front pose to a back pose and from a back pose to a front pose.

In addition, a later-described agent controller 190 is provided in the agent 200. The agent controller 190 controls and moves each joint of the agent 200 to enable the agent 200 to take a predetermined pose. The agent controller 190 is wirelessly coupled to a later-described controller 110 (electronic control unit (ECU)), and causes the agent 200 to move under control of the controller 110. Although the agent controller 190 and the controller 110 are wirelessly coupled to each other in the present embodiment, wired connection may be established through a communication line in the support connector 240, for example.

A later-described agent loudspeaker 191 is provided in the head 211 of the agent 200, and voice output is performed under control of the agent controller 190. Note that the agent loudspeaker 191 is not limited to be provided in the head 211 of the agent 200, and the agent loudspeaker 191 may be provided in other portions of the agent 200 or in other places of the vehicle 1. However, if the agent loudspeaker 191 is provided in the head 211 of the agent 200, the driver H may be further convinced that the agent 200 is really speaking, which in turn makes the driver H to be empathetic more easily, and this greatly contributes to building the driver H's trust in the agent 200.

Next, the configuration of the agent apparatus 100 according to the present embodiment of the disclosure will be described with reference to the block diagram illustrated in FIG. 5.

Figure 5:
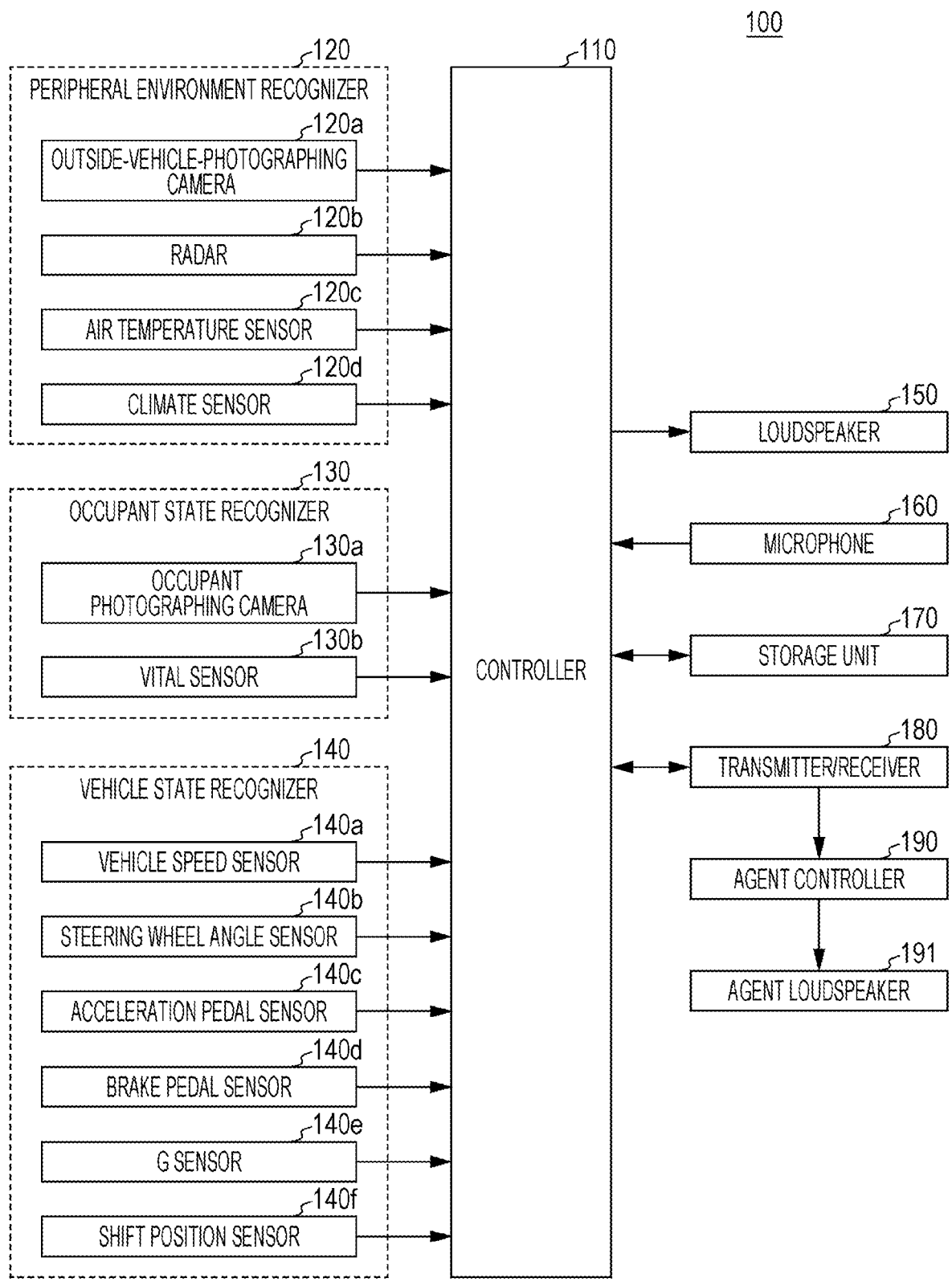
FIG. 5 is a block diagram for describing an agent apparatus.

As illustrated in FIG. 5, the agent apparatus 100 includes the controller 110, a peripheral environment recognizer 120, an occupant state recognizer 130, a vehicle state recognizer 140, a loudspeaker 150, a microphone 160, a storage unit 170, a transmitter/receiver 180, the agent controller 190, and the agent loudspeaker 191.

Note that the agent apparatus 100 illustrated in FIG. 5 is merely exemplary, and the elements of the agent apparatus 100 are changeable as needed. For example, the agent apparatus 100 according to the present embodiment of the disclosure may be implemented by including one or two of the peripheral environment recognizer 120, the occupant state recognizer 130, and the vehicle state recognizer 140 according to the information to be obtained, or the agent apparatus 100 according to the present embodiment of the disclosure may be implemented by including either one of the loudspeaker 150 and the agent loudspeaker 191. In addition, the agent apparatus 100 according to the present embodiment of the disclosure may be implemented by including an agent microphone in the agent 200 in addition to the microphone 160, or by including an agent microphone provided in the agent 200 alone in place of the microphone 160. Furthermore, although both the controller 110 and the agent controller 190 are provided in the present embodiment, both the controller 110 and the agent controller 190 need not be provided, and either one of the controller 110 and the agent controller 190 may be provided to perform functions of the two.

Controller 110

The controller 110 includes a central processing unit (CPU), read-only memory (ROM), random-access memory (RAM) (such as a ring buffer), electrically erasable programmable read-only memory (EEPROM), input/output ports, and the like. For example, in response to an input of information to the input port, various devices are controlled via the output port on the basis of control programs read from the ROM.

Note that the ROM of the controller 110 stores a data table (not illustrated) of the movements to be performed and lines to be spoken by the agent 200. In addition, a learning function using artificial intelligence (AI) or the like may be provided to perform movements and speak lines other than those stored. The CPU of the controller 110 determines movements to be performed and lines to be spoken by the agent 200 from the data table on the basis of information obtained from each of the recognizers described later and information obtained from the microphone 160. For example, in response to obtaining of what the driver H speaks from the microphone 160, the gesture "nod" is determined from the data table, and, when the driver H finishes speaking, the line "Understood" is determined. Alternatively, the data table of the movements to be performed and lines to be spoken by the agent 200 may be stored in the ROM of the agent controller 190.

Peripheral Environment Recognizer 120

The peripheral environment recognizer 120 is provided to recognize the peripheral environment of the vehicle 1 (local vehicle). In addition, the peripheral environment recognizer 120 includes an outside-vehicle-photographing camera 120a, a radar 120b, an air temperature sensor 120c, and a climate sensor 120d, and, with these devices, the peripheral environment recognizer 120 is able to recognize the peripheral environment of the vehicle 1.

Outside-Vehicle-Photographing Camera 120a

The outside-vehicle-photographing camera 120a is attached to, for example, a rear-view mirror (not illustrated) to be able to photograph the front and rear of the vehicle 1. The photographed image information is input to the controller 110, and the controller 110 stores the image information in the RAM. This enables the controller 110 to recognize the situation in front of and behind the vehicle 1 in real time and afterwards.

Radar 120b

For the radar 120b, for example, millimeter wave radars that emit radio waves to detect an obstacle or the like are used, and the millimeter wave radars are attached to a front bumper and a rear bumper of the vehicle 1 to be able to monitor the front, the front sides, and the rear of the vehicle 1. The monitored information is input to the controller 110, and the controller 110 stores the monitored information in the RAM. This enables the controller 110 to recognize the situation in front of, on the front sides of, and behind the vehicle 1 in real time and afterwards. Although the millimeter wave radars are used in the present embodiment, other radars may be used. For example, infrared radars may be used.

Air Temperature Sensor 120c

The air temperature sensor 120c is attached to, for example, the rear of the vehicle 1 to be able to detect the air temperature outside the vehicle 1. The detected air temperature is input to the controller 110, and the controller 110 stores the air temperature in the RAM. This enables the controller 110 to recognize the air temperature outside the vehicle 1.

Climate Sensor 120d

The climate sensor 120d is attached to, for example, the top of the vehicle 1 to be able to detect water drops such as rain drops falling on the vehicle 1. The detected water drop information is input to the controller 110, and the controller 110 stores the water drop information in the RAM. This enables the controller 110 to recognize the climate situation outside the vehicle 1.

In the above manner, the controller 110 is able to recognize the peripheral environment of the vehicle 1 in real time and afterwards. Accordingly, on the basis of the recognition of the peripheral environment of the vehicle 1, the controller 110 is able to report information on the peripheral environment of the vehicle 1 to the driver H by controlling the agent 200 and the agent loudspeaker 191. For example, if there is a fallen object ahead of the vehicle 1, the driver H may be reported using a gesture and voice such as "There is a fallen object ahead". This may improve safety.

Although the outside-vehicle-photographing camera 120a and the radar 120b are described as the peripheral environment recognizer 120 in the present embodiment, they are merely exemplary, and, needless to say, other devices may also be used.

Occupant State Recognizer 130

The occupant state recognizer 130 is provided to recognize the state of the driver H. In addition, the occupant state recognizer 130 includes an occupant photographing camera 130*a* and a vital sensor 130*b*, and, with these devices, the occupant state recognizer 130 is able to recognize the state of the driver H.

Occupant Photographing Camera 130*a*

The occupant photographing camera 130*a* is attached to, for example, the instrument panel 3 to be able to photograph the driver H. The photographed image information is input to the controller 110, and the controller 110 stores the image information in the RAM. This enables the controller 110 to recognize the state of the driver H in real time and afterwards. It is assumed that the state of the driver H mentioned here includes, for example, the state of the driver H's eye lids, the number of times the driver H blinks, the direction of the driver H's gaze, the direction of the driver H's face, and whether the driver H is crouching or unable to move.

Vital Sensor 130*b*

The vital sensor 130*b* is attached to, for example, a portion of the steering wheel 4 gripped by the driver H to be able to obtain vital information such as the driver H's heart rate and blood pressure. The obtained vital information is input to the controller 110, and the controller 110 stores the vital information in the RAM. This enables the controller 110 to recognize the state of the driver H in real time and afterwards.

In the above manner, the controller 110 is able to recognize the state of the driver H in real time and afterwards. Accordingly, on the basis of the recognition of the state of the driver H, the controller 110 is able to report certain information to the driver H by controlling the agent 200 and the agent loudspeaker 191. For example, the driver H may be reported using an image and voice such as "Your eye lids are down, would you like to take a break?" or "Your heart rate is faster than usual, would you like to take a break?" This leads to improvement of safety.

The occupant state recognizer 130 is able to recognize the driver H's thoughts and emotions to some extent on the basis of information obtained from the occupant photographing camera 130*a* and the vital sensor 130*b*, and information input from the microphone 160. For example, the driver H's facial expression is obtained with the occupant photographing camera 130*a*; the driver H's heart rate and blood pressure are obtained with the vital sensor 130*b*; and the volume of voice and input content are obtained with the microphone 160. From these obtained pieces of information, whether the driver H has normal thoughts and emotions or has unusual thoughts and emotions (such as being surprised or upset) may be recognized.

Although the occupant photographing camera 130*a* and the vital sensor 130*b* are described as the occupant state recognizer 130 in the present embodiment, they are merely exemplary, and, needless to say, other devices may also be used.

Vehicle State Recognizer 140

The vehicle state recognizer 140 is provided to recognize the state of the vehicle 1. The vehicle state recognizer 140 includes a vehicle speed sensor 140*a*, a steering wheel angle sensor 140*b*, an acceleration pedal sensor 140*c*, a brake pedal sensor 140*d*, a G sensor 140*e*, and a shift position sensor 140*f*, and, with these devices, the vehicle state recognizer 140 is able to recognize the state of the vehicle 1.

Vehicle Speed Sensor 140*a*

The vehicle speed sensor 140*a* is a sensor for detecting the vehicle speed of the vehicle 1. The detected vehicle speed is input as a vehicle speed signal to the controller 110, and the controller 110 stores the vehicle speed information in the RAM. This enables the controller 110 to recognize the vehicle speed of the vehicle 1 in real time and afterwards.

Steering Wheel Angle Sensor 140*b*

The steering wheel angle sensor 140*b* is a sensor for detecting the steering wheel angle of the vehicle 1 (the angle of the steering wheel 4). The detected steering wheel angle is input as an angular signal to the controller 110, and the controller 110 stores the angular information in the RAM. This enables the controller 110 to recognize the steering wheel angle of the vehicle 1 (the angle of the steering wheel 4) in real time and afterwards.

Acceleration Pedal Sensor 140*c*

The acceleration pedal sensor 140*c* is a sensor for detecting the pressed amount of an acceleration pedal (not illustrated). The detected pressed amount is input as a pressed amount signal to the controller 110, and the controller 110 stores the pressed amount information in the RAM. This enables the controller 110 to recognize the pressed amount of the acceleration pedal of the vehicle 1 in real time and afterwards.

Brake Pedal Sensor 140*d*

The brake pedal sensor 140*d* is a sensor for detecting the pressed amount of a brake pedal (not illustrated). The detected pressed amount is input as a pressed amount signal to the controller 110, and the controller 110 stores the pressed amount information in the RAM. This enables the controller 110 to recognize the pressed amount of the brake pedal of the vehicle 1 in real time and afterwards.

G Sensor 140*e*

The G sensor 140*e* is a sensor for detecting the acceleration, deceleration, and inclination of the vehicle 1. The amount of acceleration in response to detection of acceleration, the amount of deceleration in response to detection of deceleration, and the inclination angular amount in response to detection of inclination are input respectively as an acceleration amount signal, a deceleration amount signal, and an inclination angular signal to the controller 110, and the controller 110 stores the acceleration information, the deceleration information, and the inclination information in the RAM. This enables the controller 110 to recognize the acceleration, deceleration, and inclination of the vehicle 1 in real time and afterwards.

Shift Position Sensor 140*f*

The shift position sensor 140*f* is a sensor for detecting where the shift range (shift position) of the vehicle 1 is. That is, the shift position sensor 140*f* is for detecting at which position the shift range is set, such as parking range (stop position), drive range (driving position), reverse range (reverse position), or neutral range (neutral position). The shift range detected by the shift position sensor 140*f* is input to the controller 110, and the controller 110 stores the current shift range in the RAM. This enables the controller 110 to recognize where the shift range is set.

In the above manner, the controller 110 is able to recognize the state of the vehicle 1 in real time and afterwards. Accordingly, on the basis of the recognition of the state of the vehicle 1, the controller 110 is able to report information on the state of the vehicle 1 to the driver H by controlling the agent 200 and the agent loudspeaker 191. For example, if the vehicle 1 is driving at an appropriate speed, the driver H may be reported using a gesture and voice such as "The vehicle is driving at an appropriate speed". This leads to improvement of safety.

Although the vehicle speed sensor 140a, the steering wheel angle sensor 140b, the acceleration pedal sensor 140c, the brake pedal sensor 140d, the G sensor 140e, and the shift position sensor 140f are described as the vehicle state recognizer 140 in the present embodiment, they are merely exemplary, and, needless to say, other devices may also be used.

Loudspeaker 150

The loudspeaker 150 is attached to, for example, the instrument panel 3, and sound other than voice emitted from the agent 200, alarm, and the like are output. Alternatively, an audio loudspeaker built in the vehicle 1 may be used instead of providing the loudspeaker 150. In addition, as will be described later, the loudspeaker 150 may also serve as the agent loudspeaker 191.

Microphone 160

The microphone 160 is attached to, for example, the instrument panel 3, and voice emitted from the driver H and other occupants is input.

Storage Unit 170

The storage unit 170 is capable of storing information obtained from each of the recognizers mentioned above, and dialogues between the driver H and the controller 110. By accumulating these pieces of information in the storage unit 170, the controller 110 is able to recognize the driver H's driving tendency (for example, what kind of driving the driver H does), the driver H's tastes and preferences (for example, what kind of background music is preferred), and the like. By recognizing these things, dialogues that suit the driver H's driving tendency and the driver H's tastes and preferences may be actively started from the agent apparatus 100 side (agent 200).

Transmitter/Receiver 180

The transmitter/receiver 180 is capable of, for example, obtaining information using a vehicle-mounted wireless local area network (LAN), or obtaining position information using a satellite positioning system. On the basis of these obtained pieces of information and information accumulated in the above-mentioned storage unit 170, the controller 110 is also able to start dialogues that suit the driver H's driving tendency and the driver H's tastes and preferences actively from the agent apparatus 100 side (agent 200).

Agent Controller 190

The agent controller 190 includes a CPU, ROM, RAM, input/output ports, and the like (not illustrated). For example, in response to an input of information from the controller 110, the agent controller 190 is able to cause the portions of the agent 200 to move, or to cause the agent loudspeaker 191 to output a certain voice.

Agent Loudspeaker 191

The agent loudspeaker 191 is provided in the head 211 of the agent 200, as described above, and outputs voice or the like emitted from the agent 200. Providing the agent loudspeaker 191 in the head 211 of the agent 200, particularly in a portion corresponding to the mouth, enhances reality and contributes to establishment of a trust relationship. If the agent 200 is small and it is thus difficult to provide the agent loudspeaker 191 in the head 211, the agent loudspeaker 191 may be substituted with the above-mentioned loudspeaker 150, or the agent loudspeaker 191 or a substitute loudspeaker may be provided in other portions inside the vehicle 1.

Next, the movements and dialogues of the agent 200 in the agent apparatus 100 will be described. The movements of the agent 200 are performed and the dialogues of the agent are spoken by a control process performed by the controller 110. The agent controller 190 causes the portions of the agent 200 to move, and outputs voice from the agent loudspeaker 191. Note that the control flow of performing the control process is stored in the ROM of the controller 110, and the CPU of the controller 110 reads it from the ROM and performs various processes.

Figure 6:
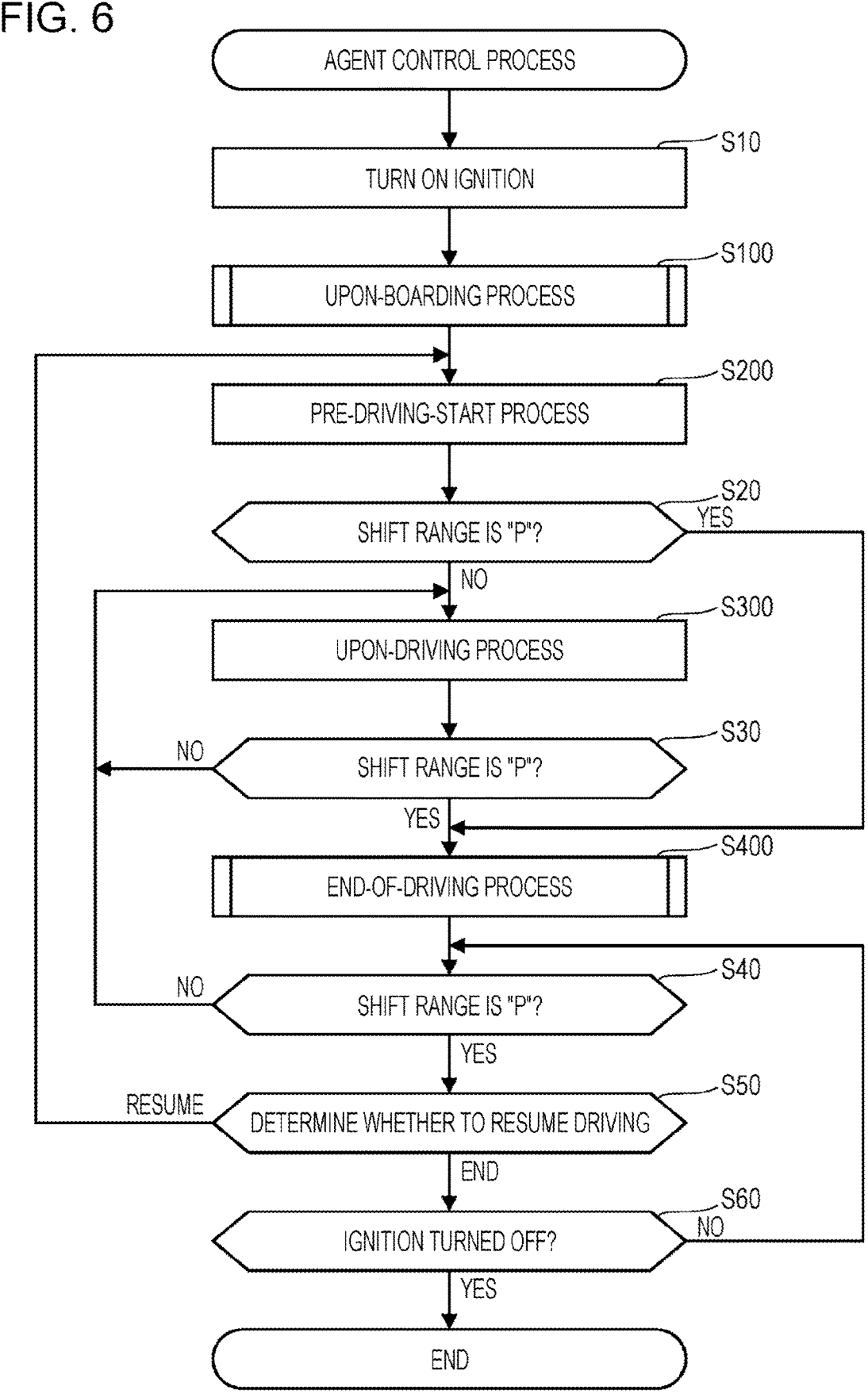
FIG. 6 is a main flowchart of an agent control process performed by a controller of the agent apparatus.

Hereinafter, a main process of an agent control process performed by the CPU of the controller 110 will be described using FIG. 6.

Step S10

In step S10, in response to turning on of the ignition, the CPU of the controller 110 starts the main process of the agent control process. In one example, the CPU of the controller 110 reads the main process of the agent control process from the ROM, starts the process, and shifts the process to step S100.

Step S100

In step S100, the CPU of the controller 110 performs an upon-boarding process. In the upon-boarding process, the CPU of the controller 110 performs an upon-start process when the driver H gets on the vehicle 1. The details of the upon-boarding process will be described later. Having finished the upon-boarding process, the CPU of the controller 110 shifts the process to step S200.

Step S200

In step S200, the CPU of the controller 110 performs a pre-driving-start process. In the pre-driving-start process, the CPU of the controller 110 performs a process before the driver H starts driving. For example, in the pre-driving-start process, precautions to be taken regarding the driving environment to the destination, and rest points are explained. In the explanation in the pre-driving-start process, the agent 200 faces the driver H, explains each item while moving both arms, and gives a cue of completion at the end of each item by moving its head up and down. Having finished the pre-driving-start process, the CPU of the controller 110 shifts the process to step S20.

Step S20

In step S20, the CPU of the controller 110 performs a process of determining whether the shift range is "P" (parking range). In one example, the CPU of the controller 110 determines whether the shift range input from the shift position sensor 140f is the parking range. In the case where it is determined that the shift range is not the parking range (non-parking range: in this case, the shift position has been changed), the CPU of the controller 110 shifts the process to step S300; and, in the case where it is determined that the shift range is the parking range (in this case, the shift position has not been changed), the CPU of the controller 110 shifts the process to step S400.

Step S300

In step S300, the CPU of the controller 110 performs an upon-driving process. In the upon-driving process, the CPU of the controller 110 performs a process of controlling the agent 200 upon driving. That is, in the case where the shift position is in the non-parking range, the CPU of the controller 110 causes the agent 200 to take a predetermined pose, and performs control during driving by using voice and movements. For example, in the case where the shift range input from the shift position sensor 140f is the drive range, the CPU of the controller 110 performs a process of controlling the agent 200 upon forward driving, such as causing the agent 200 to face forward (the traveling direction of the vehicle 1) (to take a predetermined pose); and, in the case where the shift range is the reverse range, the CPU of the controller 110 performs a process of controlling the agent 200 upon driving backward. Having finished the upon-driving process, the CPU of the controller 110 shifts the process to step S30. As will be described later, when the shift position returns to the parking range, the CPU of the controller 110 causes the agent 200 to face the driver H again, and performs voice output and a movement to express the gratitude. That is, the agent 200 faces front toward the driver H when the driver H gets on the vehicle 1 or the vehicle 1 is stopped, rotates to the back and faces the front of the vehicle 1 when the vehicle 1 is driving, and rotates again and faces front toward the driver H after the end of driving.

Step S30

In step S30, the CPU of the controller 110 performs a process of determining whether the shift range is "P" (parking range). As described above, the CPU of the controller 110 determines whether the shift range input from the shift position sensor 140*f* is the parking range. In the case where it is determined that the shift range is not the parking range, the CPU of the controller 110 shifts the process to step S300; and, in the case where it is determined that the shift range is the parking range, the CPU of the controller 110 shifts the process to step S400.

Step S400

In step S400, the CPU of the controller 110 performs an end-of-driving process. In the end-of-driving process, the CPU of the controller 110 performs an upon-end process when certain driving ends. The end-of-driving process will be described in detail later. Having finished the end-of-driving process, the CPU of the controller 110 shifts the process to step S40.

Step S40

In step S40, the CPU of the controller 110 performs a process of determining whether the shift range is "P" (parking range). As described above, the CPU of the controller 110 determines whether the shift range input from the shift position sensor 140*f* is the parking range. In the case where it is determined that the shift range is not the parking range (in this case, the shift position has been changed), the CPU of the controller 110 shifts the process to step S300; and, in the case where it is determined that the shift range is the parking range (in this case, the shift position has not been changed), the CPU of the controller 110 shifts the process to step S50.

Step S50

In step S50, the CPU of the controller 110 performs a resume-driving determination process. In the resume-driving determination process, the CPU of the controller 110 performs a process of determining whether the driver H intends to resume driving. For example, in response to an input of voice, such as "I'll resume driving", from the driver H, or in response to an input of a new destination to the navigation system using voice input or manual input, the CPU of the controller 110 determines that the driver H intends to resume driving. In the case where it is determined that the driver H intends to resume driving, the CPU of the controller 110 shifts the process to step S200; and, in the case where it is determined that the driver H does not intend to resume driving, the CPU of the controller 110 shifts the process to step S60.

Step S60

In step S60, the CPU of the controller 110 determines whether the ignition is turned off. In the case where the ignition is turned off, the CPU of the controller 110 ends the main process of the agent control process; and, in the case where the ignition is not turned off, the CPU of the controller 110 shifts the process to step S40.

Figure 7:
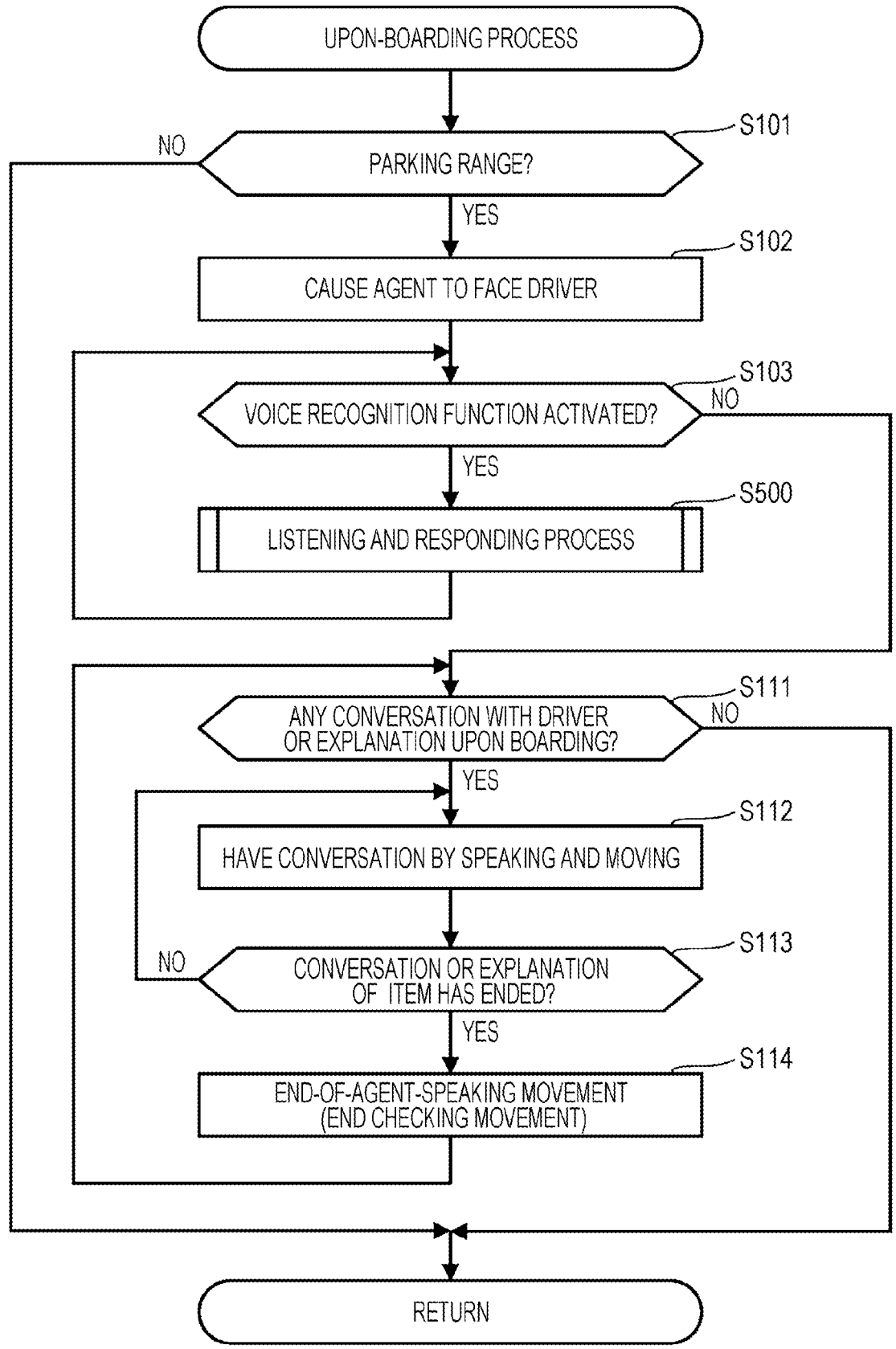
FIG. 7 is a flowchart illustrating an upon-boarding process performed by the controller of the agent apparatus.

Next, the upon-boarding process performed by the CPU of the controller 110 will be described using FIG. 7. FIG. 7 is a sub-routine of step S100 (upon-boarding process) in FIG. 6.

Step S101

In the upon-boarding process, at first in step S101, the CPU of the controller 110 performs a process of determining whether the shift position is in the parking range. In one example, the CPU of the controller 110 determines whether the shift range input from the shift position sensor 140*f* is the parking range. In the case where it is determined that the shift position is in the parking range, the CPU of the controller 110 shifts the process to step S102; and, in the case where it is determined that the shift position is not in the parking range, the CPU of the controller 110 ends the upon-boarding process. In this determination process, the fact that the shift position is not in the parking range indicates that the shift position is not in the parking range when the ignition is turned on, which indicates that the state is not normal. Accordingly, a certain process in case of abnormality may be performed.

Step S102

In step S102, the CPU of the controller 110 performs a process of causing the agent 200 to face the driver H. In one example, the CPU of the controller 110 causes the agent controller 190 via the transmitter/receiver 180 to make the agent 200 face the driver H and take the basic pose on the basis of the basic pose of the agent 200 when the vehicle 1 is stopped, which is stored in the RAM. Note that the basic pose of the agent 200 is, as illustrated in FIGS. 4A and 4B, a standing pose with both arms stretched downward at the sides, which is the initially set pose of the agent 200. Having caused the agent 200 to face the driver H, the CPU of the controller 110 shifts the process to step S103.

Step S103

In step S103, the CPU of the controller 110 determines whether a voice recognition function has been activated. In one example, the CPU of the controller 110 determines whether there has been a voice input from the driver H (or an occupant including the driver H) via the microphone 160. In the case where it is determined that the driver H has been speaking, the CPU of the controller 110 shifts the process to step S500; and, in the case where it is determined that the driver H has not been speaking, the CPU of the controller 110 shifts the process to step S111.

Note that it is desirable that the processing in step S103 and in the next step S500 be incorporated at all times as interrupt processing in the agent control process.

Step S500

In step S500, the CPU of the controller 110 performs a listening and responding process. That is, the CPU of the controller 110 performs a process of listening to what the driver H says and responding to what the driver H says. The listening and responding process will be described in detail later. Having finished the listening and responding process, the CPU of the controller 110 shifts the process to step S103.

Step S111

In step S111, the CPU of the controller 110 determines whether there is a conversation with the driver H or an explanation upon boarding. An explanation upon boarding includes, for example, special notes on the outside temperature, climate, remaining fuel information, and vehicle maintenance. In the case where it is determined that there is a conversation with the driver H or an explanation upon boarding, the CPU of the controller 110 shifts the process to step S112; and, in the case where it is determined that there is neither a conversation with the driver H nor an explanation upon boarding, the CPU of the controller 110 ends the upon-boarding process.

Step S112

In step S112, the CPU of the controller 110 causes the agent 200 to have a conversation by speaking and moving. Note that, when transmitting information using the agent 200, the CPU of the controller 110 outputs information using voice output and a movement of the body such as both arms. For example, the CPU of the controller 110 causes the agent controller 190 to move both arms of the agent 200 while speaking, thereby causing the agent 200 to perform a gesture that matches the conversation or explanation of each item. That is, the CPU of the controller 110 causes the agent controller 190 to perform corresponding movements of the right upper arm 222R, the left upper arm 222L, the right forearm 224R, the left forearm 224L, the right hand 226R, the left hand 226L, and the like of the agent 200 using the right shoulder 221R, the left shoulder 221L, the right elbow 223R, the left elbow 223L, the right wrist 225R, the left wrist 225L, and the like.

Step S113

In step S113, the CPU of the controller 110 performs a process of determining whether the conversation or explanation has ended. In the case where it is determined that the conversation or explanation has not ended, the CPU of the controller 110 shifts the process to step S112; and, in the case where it is determined that the conversation or explanation has ended, the CPU of the controller 110 shifts the process to step S114.

Step S114

In step S114, the CPU of the controller 110 performs an end-of-agent-speaking movement process. At the end of transmission of information, the CPU of the controller 110 causes the agent 200 to perform an end checking movement, and ends the transmission of information. For example, the CPU of the controller 110 causes the agent 200 to give a cue of completion by moving its head up and down after the explanation end via the agent controller 190. In addition, the agent 200 also performs an instructional movement of slightly directing its hand to the driver H to prompt the driver H to speak or move. Having performed the end-of-agent-speaking movement, the CPU of the controller 110 shifts the process to step S111, and repeats the above process until the conversation or explanation of each item ends. When the conversation or explanation of all the items ends, the upon-boarding process ends.

Figure 8:
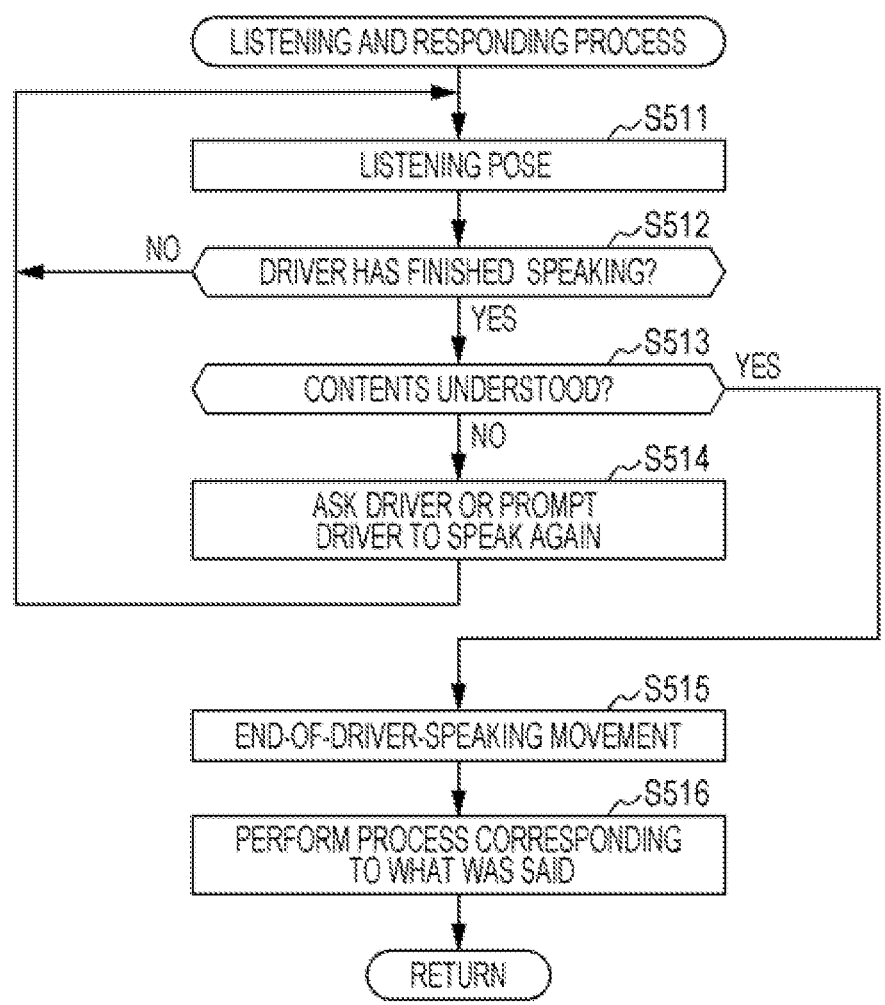
FIG. 8 is a flowchart illustrating a listening and responding process performed by the controller of the agent apparatus.

Next, the listening and responding process performed by the CPU of the controller 110 will be described using FIG. 8. FIG. 8 is a sub-routine of step S500 (listening and responding process) in FIG. 7.

Step S511

Figure 9C:
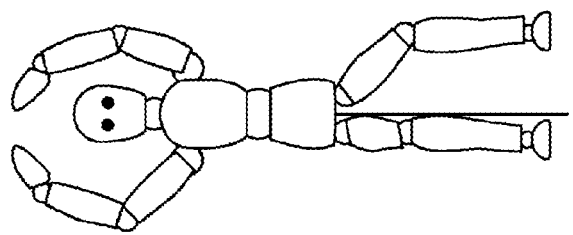
FIGS. 9A to 9C are movement diagrams illustrating exemplary movements of the agent.
Figure 9B:
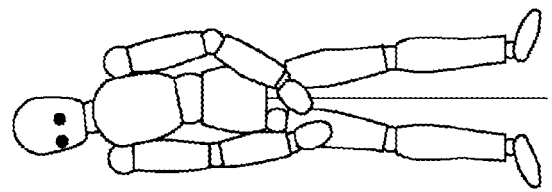
Figure 9A:
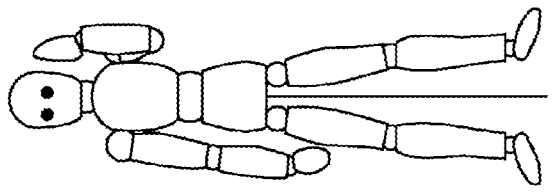

In the listening and responding process, at first in step S511, the CPU of the controller 110 performs a process of causing the agent 200 to take a listening pose. In response to an input of information from the driver H, the CPU of the controller 110 causes the agent 200 to take a listening pose indicating that the agent 200 is listening seriously. In one example, the CPU of the controller 110 performs, for the agent controller 190 via the transmitter/receiver 180, a process of causing the agent 200 to take a listening pose on the basis of the listening pose of the agent 200, which is stored in the RAM. The listening pose of the agent 200 is, for example, the pose of listening with its hand over its ear, or the pose of nodding and responding to what the driver H says. In one example, as illustrated in FIG. 9A, the agent 200 is caused to take a listening pose with its hand over its ear. During voice recognition, as illustrated in FIG. 9B, the agent 200 is caused to take a nodding and listening pose while gently bending and stretching its legs with its hands on its knees.

Step S512

Next, in step S512, the CPU of the controller 110 performs a process of determining whether the driver H has finished speaking. In this end-of-speaking determination process, like step S103 mentioned above, it is determined whether the driver H has finished speaking by determining whether the voice recognition function is active. In the case where it is determined that the driver H has finished speaking, the CPU of the controller 110 shifts the process to step S513; and, in the case where it is determined that the driver H has not finished speaking, the CPU of the controller 110 shifts the process to step S511.

Step S513

Next, in step S513, the CPU of the controller 110 determines whether the contents of what the driver H said have been understood. This corresponds to, for example, the case where the meaning of the driver H's question is not understood or the question itself is not heard, or, although the question itself is understood, there are multiple answers or the question is unanswerable. In the case where the contents of what the driver H said are not understood, the CPU of the controller 110 shifts the process to step S514; and, in the case where the contents of what the driver H said are understood, the CPU of the controller 110 shifts the process to step S515.

Step S514

In step S514, the CPU of the controller 110 performs a process of asking the driver H or prompting the driver H to speak again. That is, the CPU of the controller 110 causes the agent 200 to output voice and to move to ask the driver H about the contents that have not been understood, or to prompt the driver H to speak again. After the process of asking the driver H or prompting the driver H to speak again is performed, the process returns to step S511, and the agent 200 is caused to take a listening pose.

Step S515

In step S515, the CPU of the controller 110 causes the agent 200 to perform an end-of-driver-speaking movement. When an input of information from the driver H ends, the CPU of the controller 110 causes the agent 200 to output voice and to nod to indicate that the information has been input. In the end-of-driver-speaking movement, for example, the CPU of the controller 110 causes the agent 200 via the agent controller 190 to output the line such as "Understood" or "OK", as well as to give a cue of completion by making the "OK" sign, which is making a circle with both arms, as illustrated in FIG. 9C, or by moving its head up and down (nodding). Having performed the end-of-driver-speaking movement, the CPU of the controller 110 shifts the process to step S516.

Step S516

In step S516, the CPU of the controller 110 performs a process corresponding to what was said. For example, the CPU of the controller 110 causes the agent 200 to answer the driver H's question, perform an operation in response to certain instructions, or continue the conversation with the driver H. Here, when a certain movement is necessary in response to the driver H's instructions, the CPU of the controller 110 causes the agent 200 to repeat the instructions while moving both arms, and to nod to indicate that the operation will start. After that, the CPU of the controller 110 causes the agent 200 to perform the certain movement in response to the instructions. When the process corresponding to what was said is performed, the listening and responding process ends.

Figure 10:
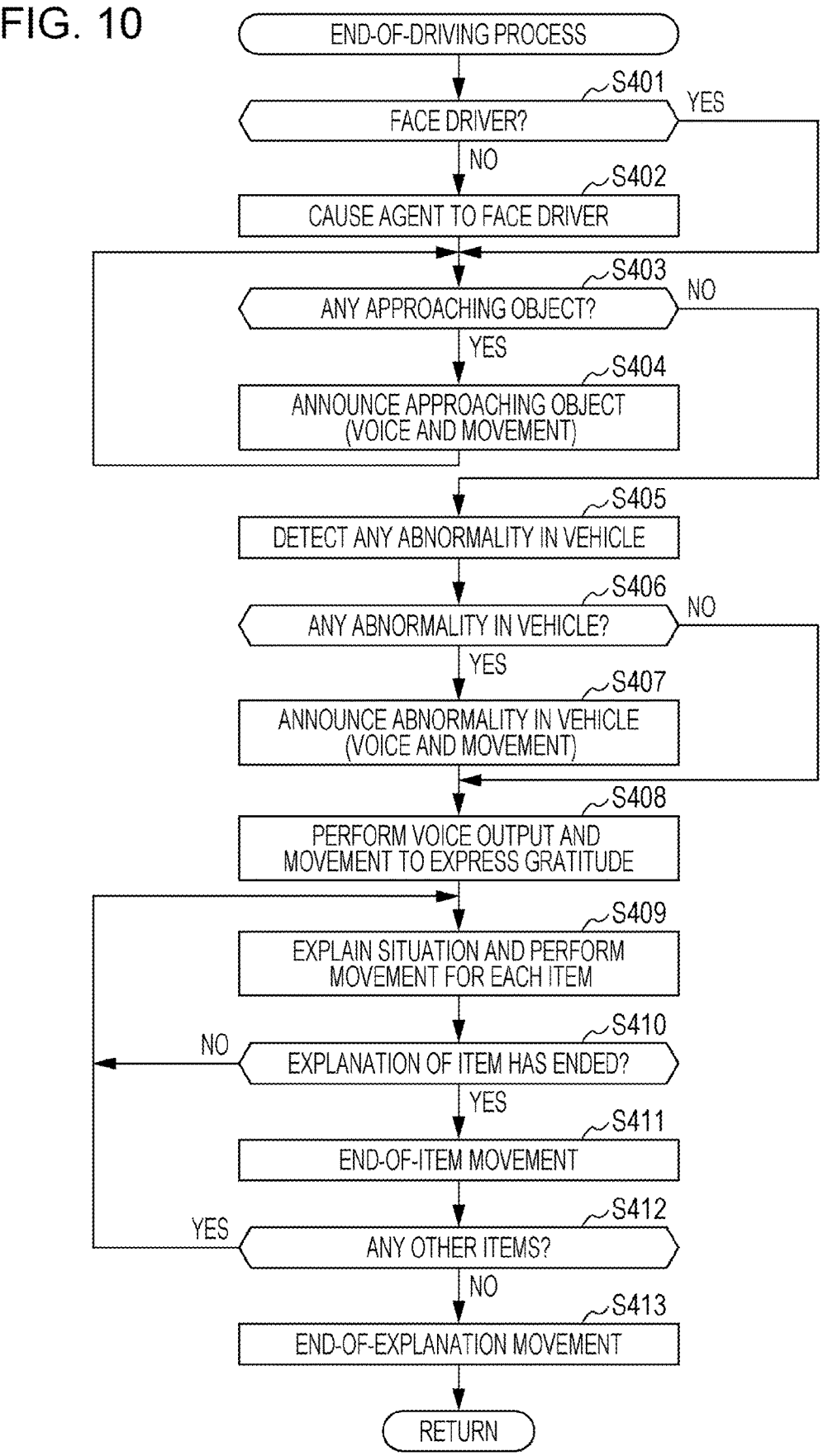
FIG. 10 is a flowchart illustrating an end-of-driving process performed by the controller of the agent apparatus.

Next, the end-of-driving process performed by the CPU of the controller 110 will be described using FIG. 10. FIG. 10 is a sub-routine of step S400 (end-of-driving process) in FIG. 6.

Step S401

In the end-of-driving process, at first in step S401, the CPU of the controller 110 performs a process of determining whether the agent 200 faces the driver H. In the case where it is determined that the agent 200 does not face the driver H, the CPU of the controller 110 shifts the process to step S402; and, in the case where it is determined that the agent 200 faces the driver H, the CPU of the controller 110 shifts the process to step S403.

Step S402

In step S402, the CPU of the controller 110 performs a process of causing the agent 200 to face the driver H. When the shift position returns to the parking range, the CPU of the controller 110 causes the agent controller 190 to make the agent 200 face the driver H again and take the basic pose. That is, the CPU of the controller 110 rotates the agent 200 to face front toward the driver H. Having caused the agent 200 to face the driver H, the CPU of the controller 110 shifts the process to step S403.

Step S403

In step S403, the CPU of the controller 110 determines whether there is an approaching object. In one example, the CPU of the controller 110 determines whether there is an object such as a person approaching the vehicle 1 on the basis of information input from various sensors. In the case where it is determined that there is an object approaching the vehicle 1, the CPU of the controller 110 shifts the process to step S404; and, in the case where it is determined that the there is no object approaching the vehicle 1, the CPU of the controller 110 shifts the process to step S405.

Note that it is desirable that the processing in step S403 and in the next step S404 be incorporated at all times as interrupt processing in the agent control process.

Step S404

In step S404, the CPU of the controller 110 announces the approaching object. Here, the CPU of the controller 110 announces the approaching object by using the voice and movement of the agent 200. For example, the CPU of the controller 110 outputs voice via the agent loudspeaker 191 indicating that a target object is approaching or prompting the driver H to take an action to avoid danger, or causes the agent 200 to point toward the approaching object or to stretch out both arms to signal the vehicle 1 to stand still. For example, as illustrated in FIG. 11, the CPU of the controller 110 causes the agent 200 to stretch out both arms to signal the vehicle 1 to stand still, and to bend and stretch both legs to enable the driver H to imagine the amount of deceleration on the basis of the depth of bending and stretching. Having finished announcing the approaching object, the CPU of the controller 110 shifts the process to step S403.

Step S405

In step S405, the CPU of the controller 110 detects whether there is any abnormality in the vehicle 1. In addition to detection of whether there is any abnormality in the vehicle 1, the CPU of the controller 110 may also detect whether there are any recommendations for the driver H, such as regarding depletion of fuel. Having finished detecting whether there is any abnormality in the vehicle 1, the CPU of the controller 110 shifts the process to step S406.

Step S406

In step S406, the CPU of the controller 110 determines whether there is any abnormality in the vehicle 1. The CPU of the controller 110 determines, by the above-mentioned vehicle abnormality detection, whether there is any abnormality in the vehicle 1, and, in the case where it is determined that there is an abnormality in the vehicle 1, the CPU of the controller 110 shifts the process to step S407; and, in the case where it is determined that the there is no abnormality in the vehicle 1, the CPU of the controller 110 shifts the process to step S408.

Step S407

In step S407, the CPU of the controller 110 announces the abnormality. Here, the CPU of the controller 110 announces the abnormality by using the voice and movement of the agent 200. Having finished announcing the abnormality, the CPU of the controller 110 shifts the process to step S408.

Step S408

In step S408, the CPU of the controller 110 performs voice output and a movement to express the gratitude at the end of driving. For example, the CPU of the controller 110 outputs voice, such as "Thank you for driving", via the agent loudspeaker 191, and causes the agent 200 to slightly nod or perform a hand gesture indicative of "well done". Having finished speaking and moving at the end of driving, the CPU of the controller 110 shifts the process to step S409.

Step S409

In step S409, the CPU of the controller 110 explains the situation and performs a movement for each item of the vehicle 1. Here, the CPU of the controller 110 explains portions of the vehicle 1 where there is no abnormality, recommendations, and so forth for each item by using the voice and movement of the agent 200. Note that, for an abnormal item, the situation may also be explained here. Having explained the situation of the vehicle 1 and performed movements, the CPU of the controller 110 shifts the process to step S410.

Step S410

In step S410, the CPU of the controller 110 determines whether the explanation of the situation of the item has ended. In the case where it is determined that the explanation of the situation of the item has ended, the CPU of the controller 110 shifts the process to step S411; and, in the case where it is determined that the explanation of the situation of the item has not ended, the CPU of the controller 110 shifts the process to step S409.

Step S411

In step S411, the CPU of the controller 110 performs an end-of-item movement. For example, the CPU of the controller 110 causes the agent 200 to give a cue indicating that the explanation of the situation of the item has ended by slightly moving its head up and down, for example. Having finished the end-of-item movement, the CPU of the controller 110 shifts the process to step S412.

Step S412

In step S412, the CPU of the controller 110 determines whether there are any other items whose situations are to be explained. In the case where it is determined that there are any other items whose situations are to be explained, the CPU of the controller 110 shifts the process to step S409; and, in the case where it is determined that there are no other items whose situations are to be explained, that is, situations of all the items have been completely explained, the CPU of the controller 110 shifts the process to step S413.

Step S413

In step S413, the CPU of the controller 110 performs an end-of-explanation movement. For example, the CPU of the controller 110 outputs voice, such as "Everything has been explained", via the agent loudspeaker 191, and causes the agent 200 to move its head up and down more greatly than that at the end of each item, or to perform a movement such as slightly extending its arm toward the driver H. When the end-of-explanation movement ends, the end-of-driving process ends.

As described above, the agent apparatus 100 according to the present embodiment causes the agent 200 to face the driver H of the vehicle 1 in the case where the shift position is in the parking range, and, when communicating information, outputs information using voice output and a movement of both arms, thereby causing the agent 200 to have conversations with the driver H using voice and movements on a regular basis. In addition, movements performed by the agent 200 need not be movements themselves to be performed by the driver H; rather, they are movements that are easily and intuitively understandable by the driver H and whose contents are easily conveyed. Therefore, the trust relationship between the agent 200 and the driver H may be easily established on a regular basis, and the driver H may be caused to instantly and smoothly take an action to avoid danger.

The agent control process according to the present embodiment is executed by the CPU or the like of the controller 110 by expanding a program stored in the ROM, RAM, EEPROM, or the like of the controller 110 in the RAM or the like of the controller 110.

In one example, the shift position sensor 140f in the present embodiment may serve as a shift position detector of the disclosure. In addition, although both the controller 110 and the agent controller 190 in the present embodiment may serve as an agent controller of the disclosure in one example, as mentioned above, the agent controller 190 alone may have the functions of both the controller 110 and the agent controller 190 in the present embodiment.

The controller 110 and the agent controller 190 illustrated in FIG. 5 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 110 and the agent controller 190. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 5.

The invention claimed is:

1. An agent apparatus comprising:
   a shift position detector configured to detect a shift position of a vehicle; and
   an agent controller configured to control an agent which is personified,
   wherein the agent controller is configured to
      cause the agent to face a driver of the vehicle in a case where the shift position is in a parking range, and upon communicating information, cause the agent to output the information using voice and a movement of arms of the agent,
   wherein:
   the agent controller is configured to
      cause the agent to take a predetermined pose in a case where the shift position changes to a non-parking range, and, in a case where the shift position returns to the parking range, cause the agent to face the driver again and to perform voice output and a movement to express gratitude.

2. An agent apparatus comprising:
   a shift position detector configured to detect a shift position of a vehicle; and
   an agent controller configured to control a personified agent,
   wherein the agent controller is configured to
      cause the agent to take a predetermined pose in a case where the shift position is in a non-parking range, and, in a case where the shift position returns to a parking range, cause the agent to face a driver of the vehicle and to perform voice output and a movement to express gratitude.

3. The agent apparatus according to claim 1, wherein:
   the agent controller is configured to
      cause the agent to take a pose indicating nodding and listening with one or both of hands of the agent over one or both of ears of the agent in response to an input of information from the driver.

4. The agent apparatus according to claim 1, wherein:
   the agent controller is configured to
      cause the agent to take a pose indicating nodding and listening with one or both of hands of the agent over one or both of ears of the agent in response to an input of information from the driver.

5. The agent apparatus according to claim 2, wherein:
   the agent controller is configured to
      cause the agent to take a pose indicating nodding and listening with one or both of hands of the agent over one or both of ears of the agent in response to an input of information from the driver.

6. The agent apparatus according to claim 1, wherein:
   the agent controller is configured to
      at an end of an input of information from the driver, cause the agent to output voice and nod to confirm that the information has been input.

7. The agent apparatus according to claim 1, wherein:
   the agent controller is configured to
      at an end of an input of information from the driver, cause the agent to output voice and nod to confirm that the information has been input.

8. The agent apparatus according to claim 2, wherein:
   the agent controller is configured to
      at an end of an input of information from the driver, cause the agent to output voice and nod to confirm that the information has been input.

9. The agent apparatus according to claim 3, wherein:
   the agent controller is configured to
      at an end of the input of information from the driver, cause the agent to output voice and nod to confirm that the information has been input.

10. The agent apparatus according to claim 4, wherein:
    the agent controller is configured to
       at an end of the input of information from the driver, cause the agent to output voice and nod to confirm that the information has been input.

11. The agent apparatus according to claim 5, wherein:
the agent controller is configured to
  at an end of the input of information from the driver, cause the agent to output voice and nod to confirm that the information has been input.

12. An agent apparatus comprising:
a shift position sensor configured to detect a shift position of a vehicle; and
circuitry configured to control a personified agent,
wherein the circuitry is configured to
  cause the agent to face a driver of the vehicle in a case where the shift position is in a parking range, and upon communicating information, output the information using voice output and a movement of its arms,
wherein:
the circuitry is configured to
  cause the agent to take a predetermined pose in a case where the shift position changes to a non-parking range, and, in a case where the shift position returns to the parking range, cause the agent to face the driver again and to perform voice output and a movement to express gratitude.

13. An agent apparatus comprising:
a shift position sensor configured to detect a shift position of a vehicle; and
circuitry configured to control a personified agent,
wherein the circuitry is configured to
  cause the agent to take a predetermined pose in a case where the shift position is in a non-parking range, and, in a case where the shift position returns to a parking range, cause the agent to face a driver of the vehicle and to perform voice output and a movement to express gratitude.

* * * * *